US005854857A

United States Patent [19]

de Queiroz et al.

[11] Patent Number: 5,854,857
[45] Date of Patent: Dec. 29, 1998

[54] USING ENCODING COST DATA FOR SEGMENTATION AND BACKGROUND SUPPRESSION IN JPEG-COMPRESSED IMAGES

[75] Inventors: Ricardo L. de Queiroz, Fairport; Reiner Eschbach, Webster, both of N.Y.

[73] Assignee: Xerox Corporation, Stamford, Conn.

[21] Appl. No.: 721,074

[22] Filed: Sep. 26, 1996

[51] Int. Cl.⁶ ...................................................... G06K 9/36
[52] U.S. Cl. ........................ 382/232; 382/233; 382/238; 358/432; 358/433
[58] Field of Search ................................... 382/232, 233, 382/235, 238, 243, 260, 317, 171, 176; 358/432, 433, 298, 456; 395/500; 370/416

[56] References Cited

U.S. PATENT DOCUMENTS

| | | | |
|---|---|---|---|
| 4,400,738 | 8/1983 | Tomory et al. ......................... | 358/456 |
| 4,504,972 | 3/1985 | Scherl et al. .......................... | 382/171 |
| 5,020,121 | 5/1991 | Rosenberg ............................ | 382/238 |
| 5,048,096 | 9/1991 | Beato ................................... | 382/176 |
| 5,229,864 | 7/1993 | Moronaga et al. .................... | 358/433 |
| 5,257,113 | 10/1993 | Chen et al. ........................... | 358/426 |
| 5,327,248 | 7/1994 | Miller et al. ........................ | 358/261.4 |
| 5,379,122 | 1/1995 | Eschbach ............................. | 358/426 |
| 5,521,718 | 5/1996 | Eschbach ............................. | 358/432 |
| 5,541,919 | 7/1996 | Yong et al. ........................... | 370/416 |
| 5,566,255 | 10/1996 | Pavlidis .............................. | 382/317 |
| 5,625,460 | 4/1997 | Tai ....................................... | 358/298 |
| 5,751,862 | 5/1998 | Williams et al. .................... | 382/260 |

OTHER PUBLICATIONS

Yasuda et al. "Data Compression for Check Processing Machines"— IEEE—vol. 68. No. 7—Jul. 1980, pp. 874–885.

*Primary Examiner*—Jose L. Couso
*Assistant Examiner*—Anh Hong Do
*Attorney, Agent, or Firm*—R. Hutter

[57] ABSTRACT

An enhancement to the standard JPEG image data compression technique includes a step of recording the length of each string of bits corresponding to each block of pixels in the original image at the time of compression. The list of lengths of each string of bits in the compressed image data is retained as an "encoding cost map" or ECM. The ECM, which is considerably smaller than the compressed image data, can be transmitted or retained in memory separate from the compressed image data along with some other accompanying information and is used as a "key" for editing or segmentation of the compressed image data. The ECM, in combination with a map of DC components of the compressed image, can also be used for substituting background portions of the image with blocks of pure white data, in order to compress certain types of images even further.

7 Claims, 3 Drawing Sheets

USING ENCODING COST DATA FOR SEGMENTATION AND BACKGROUND SUPPRESSION IN JPEG-COMPRESSED IMAGES

CROSS-REFERENCE TO RELATED APPLICATION

Reference is made to the following co-pending patent application: Ser. No. 08/721,519 (Attorney docket number D/96090), entitled "Compression of Image Data with Retaining Cost Data for Each Compressed Image Block."

INCORPORATION BY REFERENCE

The following U.S. patents, assigned to the assignee hereof, are hereby incorporated by reference: U.S. Pat. No. 5,379,122, entitled "Decompression of Standard ADCT-Compressed Images," and U.S. Pat. No. 5,521,718, entitled "Efficient Iterative Decompression of Standard ADCT-Compressed Images."

Also included by reference is the material in W. B. Pennebaker and J. L. Mitchell, *JPEG: Still Image Compression Standard*, New York, N.Y.: Van Nostrand Reinhold, 1993.

FIELD OF THE INVENTION

The present invention relates to a method for processing compressed image data with the intention to identify regions in the image that have different image characteristics without the requirement to decompress the image data stream. The compressed image data will generally have the data format as practiced under the JPEG (Joint Photographic Expert Group) standard.

BACKGROUND OF THE INVENTION

U.S. Pat. No. 5,379,122, incorporated by reference above, gives a general overview of a data-compression technique which is consistent with the JPEG device-independent compression standard. The details of the operation of the JPEG standard are given in the patent and in the also referenced book, but for present purposes, the essential properties of JPEG compression are as follows. An original image which is desired to be transmitted from one hardware device to another, or which is to be retained in an electronic memory, is divided into a two-dimensional array of typically square blocks of pixels. In one typical embodiment, the original image is divided into blocks with each block comprising 8×8=64 pixels from the original image. Each individual pixel in the image, in turn, may express a grayscale value, which may be on a scale from, for example, 0 to 255 or 0 to 4095. There is thus derived from each block in an image to be transmitted a matrix of 64 gray level values, each value relating to one pixel in an 8×8 matrix. This matrix is then subjected to certain mathematical operations. The first step is to perform a "discrete cosine transform," or DCT. In effect, the DCT changes the image space for the matrix, so that a vector related to the average luminance of all of the pixels in the block is made into an axis of the space. Following the DCT, the coefficients in the original matrix still completely describe the original image data, but larger value coefficients tend to cluster at the top left corner of the matrix, in a low spatial frequency region. Simultaneously, the coefficient values toward the lower right hand portion of the matrix will tend toward zero for most photographic images.

The top-left entry in each matrix, which represents the average luminance of all pixels in the matrix, is known in JPEG as the "DC coefficient" of the block, with all the other entries in the matrix being known in JPEG as the "AC coefficients" of the block. In a preferred embodiment of JPEG, the transmitted DC coefficient of each block is converted to a difference relative to the DC coefficient of the block to the left of the block in the original image; this makes the magnitude of each DC coefficient smaller in absolute terms.

Following the DCT step, individual coefficients in the matrix are quantized, or in effect made into smaller numbers, and rounded. Then, the quantized coefficients are Huffman-encoded to yield a string of binary digits, or bits. There may be other lossless compression steps to encode the quantized DCT coefficients, but the final product is inevitably a string of bits for each block, each block resulting in a string of bits of a different length.

Under JPEG compression, each block of the original image will result in a string of bits of unpredictable length. A block with more details is generally more difficult to compress than a smooth block. In this sense, active blocks, with more details or sharp edges, are generally encoded using a larger amount of bits. On the other hand, smooth blocks generally demand few bits for its encoding. There is a non-trivial relation between the activity of a block and the number of bits used in the encoding, i.e. the compression achieved.

It is understood that a "block" may correspond to a single tile of an image or to any predefined region of an image encompassing multiple colors. In the preferred embodiment of the compression application (JPEG), one or a plurality of blocks of each color separation can be grouped to form larger structures known for those skilled in the art of JPEG as MCU (minimum coded unit). According to the present invention, it is understood that a block may represent one or multiple blocks, or one or multiple MCUs.

As is well known, in a digital printing apparatus, the data associated with black text in an original image will typically require a high contrast printing technique when the image is printed, and, for example, a halftone or contone image will be optimally printed with a slightly different printing technique, whether the general printing technique is, for example, xerographic or ink-jet. It is therefore desirable, when an image is received, to be able to identify specific portions of the image as text, halftone (that is, the variable-size dot pattern characteristic of lithographically-printed images), or contone (as would be derived from a chemical photograph). In most cases, the image is available in compressed format. The identification of the said regions may involve decompressing the image and applying a segmentation algorithm. It is desirable to utilize the compressed data directly to ascertain which printing techniques will be applied to each image region.

The co-pending application referred to above discloses the creation of an "encoding cost map" derived from compressing. The encoding cost map is a map assembled from data derived from JPEG compression of an original image. The encoding cost map can be derived from the compressed data directly, or it can be stored along with the compressed data as shown in the co-pending application. In the encoding cost map, the longer the resulting string of bits from compression of a particular block, the higher the cost function for that block. When assembled in a two-dimensional map, these cost functions form the encoding cost map. It is an object of the present invention to exploit the encoding cost map for segmenting the original image, into, for example, text, halftone, and contone regions.

DESCRIPTION OF THE PRIOR ART

U.S. Pat. No. 5,229,864 discloses another decoding/decompression technique which uses a "data code counting section." The data code counting section determines the amount of coded data in each block of the compressed picture data. This count of data in each block is then used as part of an "interblock filter" which normalizes image data of adjacent blocks in order to eliminate or reduce an edge or other distortion appearing at the border between blocks in the reconstructed image.

U.S. Pat. No. 5,257,113 discloses a system for creating "windowed" (multi-image) images from plural streams of JPEG-compressed data. A stream of image data for each window is divided into coding intervals, and each coding interval is compressed and mixed. The mixed compressed data is then decompressed for display.

U.S. Pat. No. 5,327,248 discloses a system for editing JPEG-compressed images. Absolute values of DC components of compressed image blocks are retained for the left edge of an image, so that the compressed image may be imported into another image.

U.S. Pat. No. 5,521,718, assigned to the assignee hereof, discloses a method of decompressing a document image which has been compressed with JPEG and a subsequent statistical encoding method. As part of this method, one of the first steps in decompression is to measure the length of the Huffman-coded data in the received compressed image data, and deriving therefrom an "iteration number." This "iteration number" can then be used as a hint to a subsequent filtering stage as to the essential nature of the image in the particular block, e.g., whether it is a contone or halftone image. Different derived iteration numbers will inspire the use of different image-processing techniques in the restructuring of the final received image.

One basic text which describes JPEG and associated techniques is W. B. Pennebaker and J. L. Mitchell, *JPEG: Still Image Compression Standard,* New York, N.Y.: Van Nostrand Reinhold, 1993.

SUMMARY OF THE INVENTION

According to the present invention, there is provided a method of processing compressed digital data derived from an original image, the data being organized as a set of blocks, each block comprising a string of bits corresponding to an area of the original image. A cost function is derived for each string of bits, the cost function being a number related to the number of bits in each string of bits. A segmentation technique is applied to the cost function.

According to another aspect of the present invention, there is provided a method of processing compressed digital data forming an original image, the data being organized as a set of blocks, each block comprising a string of bits corresponding to an area of the original image, each string of bits including data related to a DC component of the block. A DC component is derived for each block. A cost function is derived for each string of bits, the cost function being a number related to the number of bits in each string of bits. Each block is identified as a background block if the DC component is not less than a first predetermined threshold and if the cost function is not more than a second predetermined threshold. For each identified background block, the string of bits for the background block is replaced with a predetermined fixed string of bits in the compressed image data.

DETAILED DESCRIPTION OF THE INVENTION

Figure 1:
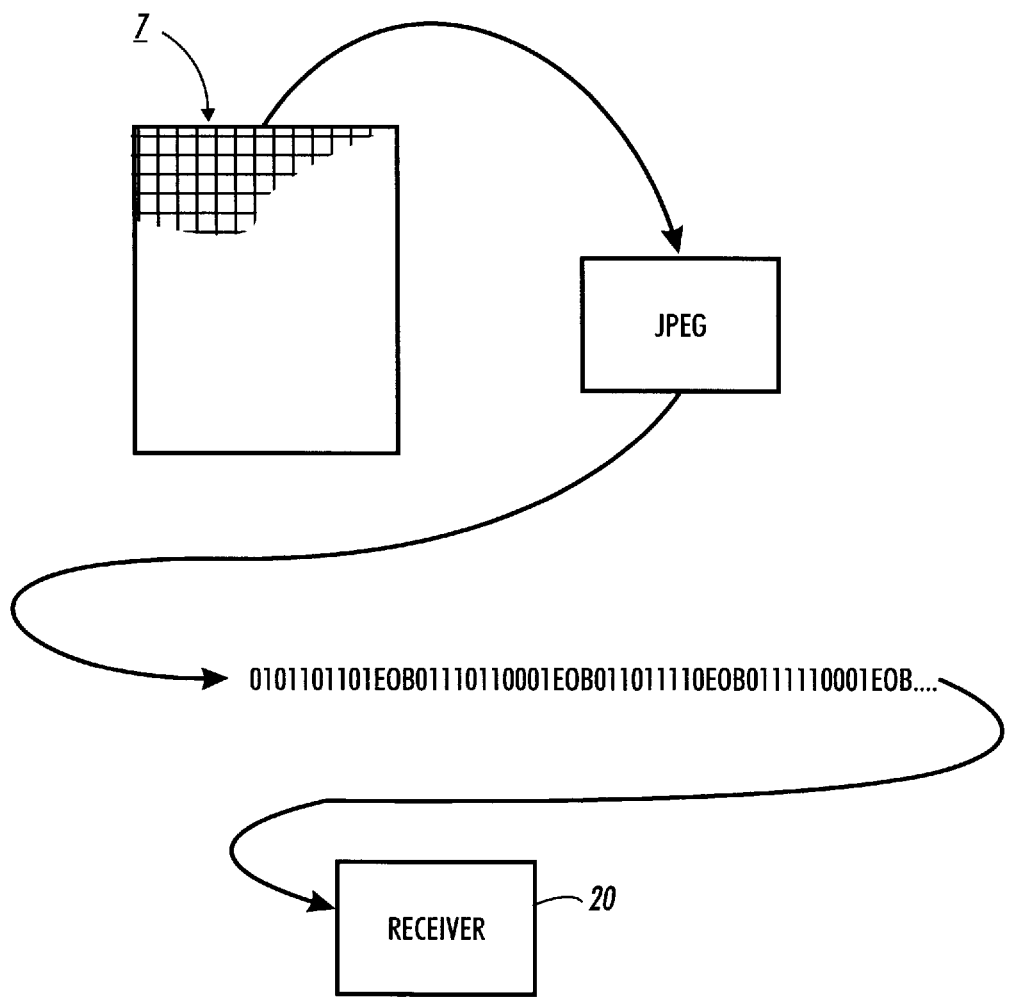
FIG. 1 is a simplified diagram illustrating how the JPEG compression technique is applied to an original image.

FIG. 1 is a simplified symbolic rendering of the JPEG compression technique. An original image, indicated as I, is retained as a quantity of digital data, such as by scanning a hard-copy image, or otherwise creating an image electronically, as on a computer. The original image I is divided into a number of square blocks, in a typical case each square block comprising 64 pixels in an 8×8 array. Each of these blocks forming image I is then submitted to a JPEG compression technique which, as known in the prior art, converts each image block into a string of binary digits (bits), with each string of bits being of an unpredictable length. As shown in FIG. 1, each string of bits emerging from the JPEG technique commonly ends with a special sequence of bits which are recognized by a decompression system as indicated as "end of block," or EOB. In the special case where all the quantized DCT coefficients are non-zero, there is no need for inserting the EOB symbol. As shown in FIG. 1, the letters EOB are used to show an end of block, but in a real-world situation, the EOB symbol would be a recognizable unique sequence of 0's and 1's, such as 1010. The strings of bits, each representing one block of pixels, is then sent to a "receiver," which as mentioned above can be in the form of a memory from which the compressed image data can be retrieved at a later time.

(Although the present embodiment of the invention describes each block as representing a square array of pixels in an image, it is conceivable, under the claims herein, that a "block" could comprise a non-square or even a linear array of pixels within the image. Also, a "block" may correspond to any predefined region of an image encompassing multiple colors. In a preferred embodiment, one or a plurality of blocks of each color separation can be grouped to form larger structures known in JPEG as a minimum coded unit, or MCU. According to the present invention, it is understood that a "block" may represent one or multiple blocks, or one or multiple MCUs.)

The proposed method may be used in combination with "restart markers," which are a utility available within the JPEG standard. A "restart marker" is an optional resource defined by JPEG comprising a specific and unique byte-aligned sequence of bits that can be inserted in the compressed bit stream. When used, it is placed periodically in the bit stream after a fixed number of compressed image blocks.

Figure 2:
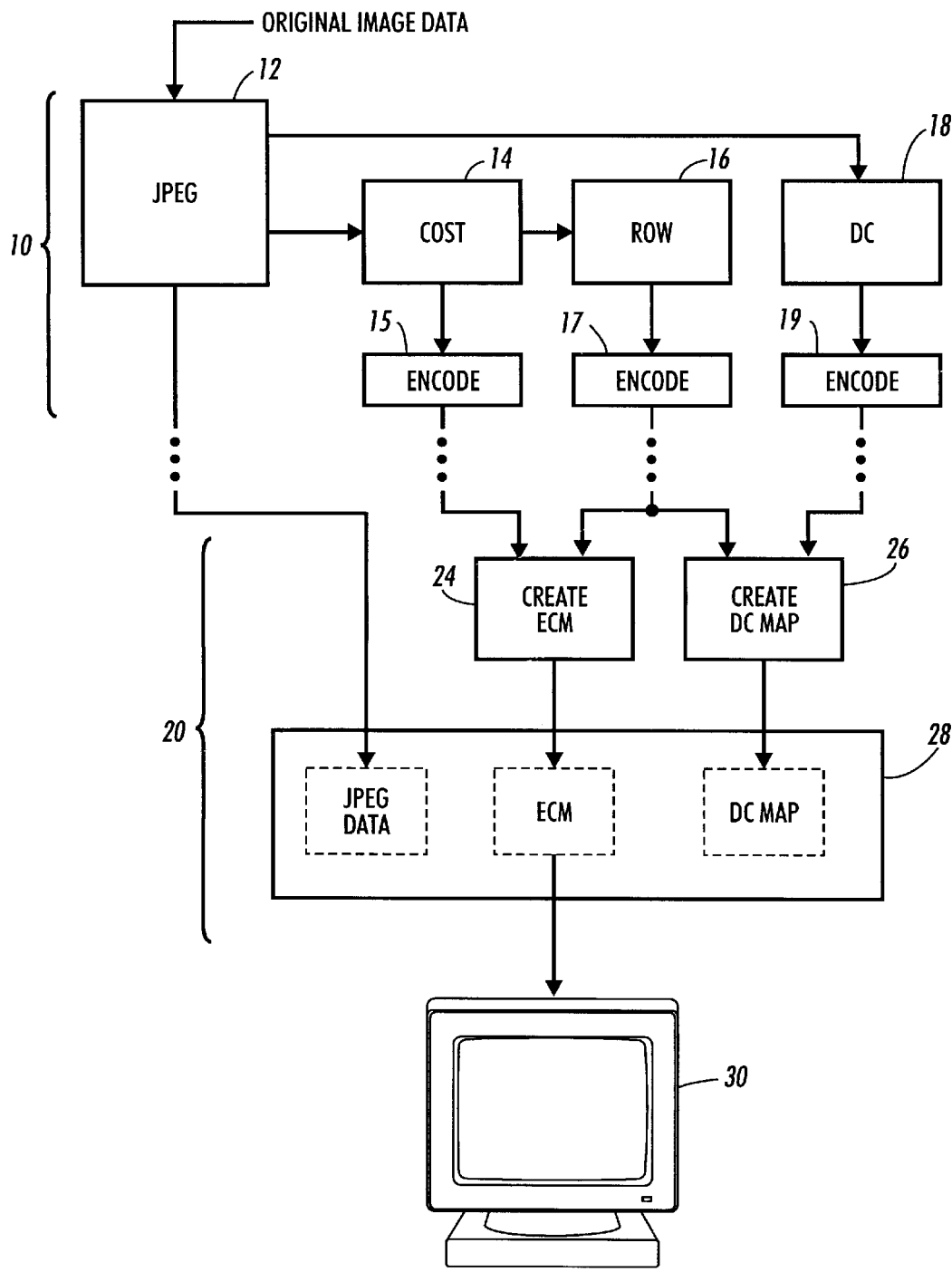
FIG. 2 is an illustration of the relationship of the "side information" of the present invention to compressed image data.

FIG. 2 is a simplified diagram illustrating the compression and transmission method of the present invention. Shown in FIG. 2 is a "transmitter" generally indicated as 10, which sends various data to a "receiver" indicated as 20. Once again, as mentioned above, transmitter 10 and receiver 20 could be parts of the same general apparatus, with the "transmission" steps, as recited in the claims, being in the form of placing the transmitted data in a memory for later retrieval by the receiver.

As shown in the Figure, data from the original image to be transmitted, the pixels of which are divided into for example 8×8 pixel blocks, are first compressed by the standard JPEG compression technique, indicated as function 12. However, according to the present invention, beyond the basic steps of JPEG compression, the individual strings of bits, each string corresponding to one block of the original image, are in turn used to derive a "cost function" for each block. The "cost function" is a number related to the length, in number of bits, of a bit string associated with a particular block in the original image. This cost function may be the exact number of bits in a particular string of bits, or could be otherwise related to this number such as the actual number of bits plus or minus some fixed number. This cost function may also count the bits generated by "stuffing bytes" which are defined in the JPEG standard. This calculation of the cost function for each block is shown as function 14 in the Figure.

In a real-world JPEG compression system, the length of the bit string for each block is expected to be small. This cost function may be encoded into an 8-bit cost function entry. It may also be optionally encoded using Huffman or any other entropy coding technique. The 8-bit encoding allows encoding of all values ranging from the minimum permissible amount of bits in a block up to 255 bits per block. The minimum number is never smaller than 2 and its default value for JPEG luminance tables is 4. Unused codes (below the minimum number) may be used to represent an escape sequence to indicate that more than 255 bits were used in the respective block. After the escape sequence, the real cost function is indicated using any simple format.

In addition to deriving the cost function, or number of bits, for each block, it is desirable to calculate at the transmitter 10 information about the sum of the cost functions for each "row of blocks" in the image, such as indicated by function 16 in the Figure. It will be understood that a row of blocks corresponds to a segment of the image encompassing a fixed number of blocks. This "row" may or may not correspond to a row of blocks in horizontal-scan direction in the image. According to the preferred embodiment of the present invention, whenever "restart markers" are not used, a "row of blocks" will preferably imply a segment of blocks corresponding to one horizontal row of blocks in the original image. In the preferred embodiment of this invention, if "restart markers" are used, a "row of blocks" is understood as a segment of blocks corresponding to fractions of the section of blocks in between "restart markers" or to an integer number of these sections. This "row-sum" can be encoded in typically 2–4 bytes per row without compression, although Huffman-encoding could conceivably be used here, such as at function 17 in the Figure.

Further according to a preferred embodiment of the present invention, there is determined, within transmitter 10, a DC coefficient for each JPEG-compressed block of pixels in the original image, as shown at function 18. Using the DCT, the DC coefficient for each block is merely the top left entry in the data matrix for the particular block, which equals the average luminance for all of the pixels in the block. A preferred, "decimated" form of this DC map has N DC coefficients per "row of blocks". If N=0, the decimated DC map is not stored at all. If "restart markers" are not used, each row of blocks is divided into N sections, and otherwise the "row of blocks" is divided into N+1 sections. Each entry in the map is the DC coefficient of the left most block of each section. This decimated DC map can be encoded using any simple format or it can be compressed by means of entropy coding techniques.

In summary, the basic functions of the transmitter 10, according to the illustrated embodiment of the present invention, are basic JPEG encoding, calculating the cost functions for each JPEG-encoded block, calculating the sum of cost functions for each row of blocks in the image, and calculating the DC coefficients for each or some block of pixels. The cost functions, row functions and DC coefficients can be considered "side information" relative to the compressed image data derived directly from the JPEG compression algorithm. Depending on the particular application of the invention, this "side information" can be transmitted simultaneous with the compressed image data, such as through one or more additional parallel channels, or if the compressed image data is simply to be stored for later retrieval, the side information can be placed in a separate set of portions of the memory. The cost function is generally much smaller than the compressed data itself, being roughly 64 times smaller than the original image size. Therefore, the cost function, and by extension the row functions and DC coefficients, is not a major tax on the capacity of a transmission system.

As shown in the Figure, data from the original image to be transmitted, the pixels of which are divided into for example 8×8 pixel blocks, are first compressed by the standard JPEG compression technique, indicated as function 12. However, for the present discussion, the image is assumed compressed by a known external application. According to the present invention, by partially decoding the compressed image, each individual string of bits corresponding to one block of the original image are used to derive a "cost function." The "cost function" is a number related to the length, in number of bits, of a bit string associated with a particular block in the original image. This cost function may be the exact number of bits in a particular string of bits, or could be otherwise related to this number such as the actual number of bits plus or minus some fixed number. This cost function may also count the bits generated by "stuffing bytes" which are defined in the JPEG standard. This calculation of the cost function for each block is shown as function 14 in the Figure. This "cost function" can be encoded using any simple format.

Looking at the lower half of FIG. 2, there is shown the functions of the "receiver" 20, which once again is merely the set of functions which operate on the compressed image data and the side information, which may in fact be part of the same apparatus as the transmitter 10. One important function of the receiver 20 is to establish a relationship between the cost function and the row functions which are derived from the cost functions, so that an "encoding cost map," or ECM, can be created. An encoding cost map, or ECM, can be defined as a set of the cost functions of various blocks in the original image, understood as a two-dimensional map. It is thus clear that the relationship between row functions and cost functions be established so that the various cost functions can be placed into a two-dimensional map. This creation of the ECM is indicated as function 24 in the Figure, and the ECM may be displayed to the user on a screen or in a print, such as shown by function 30 in the Figure. This ECM, as will be explained below, can itself be subjected to various image-processing techniques.

It is also desirable, for reasons which will be explained below, to maintain a separate map of some of the DC coefficients of the original image, which may be useful for subsequent image-processing techniques. This function is shown as 26 in the Figure, although as mentioned above DC coefficients of each block of pixels are always calculated as part of the standard JPEG process. Row data from transmitter 10 can be used to help map the DC coefficents to a two-dimensional map, or other techniques can be used.

The receiver may reconstruct an "encoding cost map", or ECM, with all or part of the cost functions where each entry is related to one block of the original image. The ECM can be used to "segment" a received image; that is, the ECM can be used to identify portions of a larger image, such as an image containing both text and halftone images, so that the received image can subsequently be printed with optimal techniques for each type of image or that the the image might be divided into the individual components. As is well known, in a digital printing apparatus, the data associated with black text in an original image will typically require a high contrast printing technique when the image is printed, and, for example, a halftone or contone image will be optimally printed with a slightly different printing technique, whether the general printing technique is, for example, xerographic or ink-jet. It is therefore desirable, when an image is received, to be able to identify specific portions of the image as text, halftone (that is, the variable-size dot pattern characteristic of lithographically-printed images), or contone (as would be derived from a chemical photograph). The ECM, as included in the "side information" derived incidental to the compression of the original image data, or derived from the received information, is a tool for such segmentation.

Image regions with high level of details often generate high valued ECM entries, while smooth regions tend to be fairly compressed, therefore, generating small ECM entries. Strong edges such as those present in halftone patterns and in text borders tend to generate high valued ECM entries, while pictorial material and background areas do not. In other words, the ECM may provide the necessary information to perform an image segmentation without decompressing the image.

Using the ECM as a data source for segmentation purposes provides many practical advantages. First, the ECM is simple to compute and can also be used for segmentation purposes without decompressing the image data. Further, the size of the ECM is 8×8=64 times smaller than the original image, making it more tractable with lower storage requirements. Further, using the ECM captures information relating high-frequency components of the original image within each block, ultimately because, according to the JPEG method, a high frequency component, such as would occur with a halftone image, will generate high encoding costs.

The following is a simple implementation of a segmentation technique using an ECM. It will be apparent, however, that more sophisticated variations to various steps of the technique may be employed as well. However, use of such more sophisticated variations of individual steps, or the inclusion of further steps in the process, will not detract from the basic concept of using the ECM as the original data for segmentation purposes. It will also be noted that certain segmentation techniques, such as thresholding, need not be performed on the two-dimensional ECM; such techniques can be performed on the cost functions one at a time, independently of neighboring cost functions or on a predetermined subset of cost functions.

In the preferred embodiment of the invention, the main steps for performing a segmentation technique on the ECM are: obtaining the ECM; optionally cleaning the ECM by neighborhood operations and using the data to create a segmentation map of the original image, distinguishing between areas of high activity and low activity.

Another preferred embodiment of the invention, includes the steps of: obtaining the ECM; cleaning the ECM by suppressing background and continuous-tone images while leaving regions of high activity (that is, high cost function); isolating halftone regions, and then suppressing the halftone regions to isolate regions including text and graphics.

More specifically, the above basic steps can be enhanced as follows. To clean the image and suppress the background and continuous tone regions, the ECM can be thresholded so that all pixels (that is corresponding to 64-pixel blocks in the original image) with a cost function below a certain $t_0$ are set to 0 while those cost functions above $t_0$ are left untouched.

To isolate areas of halftone, there is first applied a median screen, wherein only if the pixel is not 0 is it replaced by the median value in a 3×3 window. Here the median screen can be replaced by a general order statistic filter, making the appropriate adjustment in the filtering process. Then, average blocks of n×n pixels are averaged and the average is thresholded with a threshold level of $t_1$. If a level is greater than $t_1$ it is made 1, otherwise it 0. At this point, the image is now n×n smaller than the ECM. Isolated spots can then be cleaned using a very simple connected-components analysis, such as: if and only if the pixel is not 0 and at least two more of its neighbors are 0, then the output pixel is non-0. Following this step, the image is dilated using m×m operator. Such a dilation closes holes in the halftone regions and gives a safety margin. The mask is then interpolated to obtain a map of the size of the original image.

The halftone regions are extracted from the original ECM by performing the interpolation of the halftone mask in two steps. In the first step, the mask is interpolated to fit the size of the original ECM and in the second step, the size of the ECM is interpolated to that of the original image. The halftone mask at the resolution of the original ECM is then used to extract such regions from the clean ECM. Once the halftone mask is removed in this way, the remainder of the image is then processed as follows. A threshold with a decision level of $t_2$ is applied, yielding a binary image. A p×p square is used to close gaps and make a more solid region of the text regions. The mask is then interpolated by a factor of 1:8 in each direction to get a mask the size of the original image. This last step generates a mask for the text and graphics regions.

In an embodiment of the above process with grayscales ranging from 0 to 255, a useful set of parameters is: n=4; m=5; p=9; $t_0$=75; $t_1$=90; and $t_2$=70.

Figure 3:
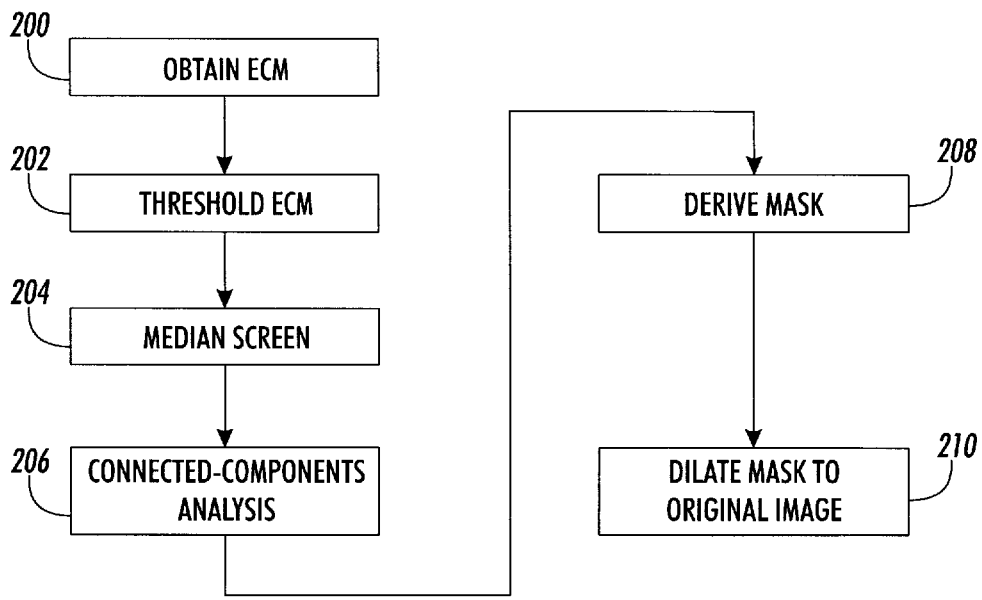
FIG. 3 is a flow-chart illustrating various segmentation techniques which can be applied to an encoding cost map according to the present invention.

FIG. 3 is a simple flow chart illustrating some of the possible steps that can be used when exploiting the ECM for segmentation, as described above.

At step 200 the ECM for a particular image is obtained, either having been derived from a quantity of compressed image data, or received at a receiving station, having been derived elsewhere in the system. The ECM is then subjected to a series of segmentation techniques which would distinguish, for instance, halftone regions from text regions in the ECM. In this particular embodiment, at step 202 the various bit strings associated with the ECM are thresholded and then applied to a median screen, such as at step 204. Further, with connected-components analysis techniques known in the art, alphanumeric characters can be recognized in the ECM, as shown at step 206. In a typical simple case, those portions of the ECM which are not identified as text or background can be by default identified as halftone regions. Once certain regions are identified as either text or halftone regions, a mask can be readily derived which covers the positions within the ECM corresponding to, in one embodiment, halftone areas, such as at step 208. This mask is then used to refer back to the original image data to identify halftone and text regions within the original image. As shown at step 210 of FIG. 3, if the mask created from the ECM (which, in this embodiment, covers halftone regions) is dilated or otherwise interpolated to fit the size of the original image data, what is covered by the dilated ECM mask will neatly cover or mask the halftone regions in the original image. In this way an image segmentation technique is applied to the much smaller ECM to generate a mask in which the relative positions of text and halftone portions within the ECM exactly correspond to the positions of equivalent portions in the original image data. By dilating the mask created with the ECM to the size of the original image, the dilated mask can be simply applied to the original image data to segment the original image data.

In a practical application of segmentation using the ECM, the ECM and not the compressed data itself is used to identify sub-areas of the original image for segmentation. However, once the sub-areas, such as photographs, within a particular image are identified in the ECM, it is typical to go back to the original compressed data and find the particular desired compressed data which has been located through the ECM; in this model, after the ECM is used to locate desired portions of the actual compressed data, the ECM is no longer needed.

The ECM can be derived from the compressed data at the receiver. Nonetheless, the transmission of the ECM either before, or simultaneously with, transmission of the compressed data can facilitate significant savings in both memory consumption and decompression time. Further capabilities for increasing compression ratio or otherwise processing compressed images are enabled if the ECM is used in combination with other image information, such as a map of the DC component for every 8×8 block of pixels. That is, the ECM and a map of DC components can be used to "hint" one another for an even greater increase in compression ratio of the image data. One technique which is facilitated by using both types of data is particularly useful in the context of hard-copy scanning: the suppression of background image when, for example, the originals are in black ink on colored paper, or on old, discolored paper, which is not uncommon when scanning old, archived documents or documents on recycled paper. If the color of an original sheet is read as image data, the sheet color will consume a significant amount of compressed image data. Under the JPEG baseline standard, using default luminance Huffman tables, a perfect background of pure white would consume 6 bits per 8×8 pixel block for its encoding. If the smooth background of colored paper is taken into account in the compression algorithm, such an "off-white" block can for example consume 60 bits per 8×8 pixel block. Assuming that these background variations related to the paper convey no useful information, they can be suppressed and replaced by areas of a perfect "white" background. The task of identifying the unnecessary background areas on an original image can be carried out by a comparison of the ECM for an image with a map of the DC components for the same image.

One simple technique is to identify 8×8 blocks of pixels in the original image as "mere background" if, for that particular set of pixels, the DC component (or a function of the DC components of the target block and of its neighbor blocks) is above a first threshold, and the cost function (or a function of the cost functions of the target block and of its neighbor blocks) is below a second threshold. Blocks of pixels which satisfy these requirements can then be replaced with a "perfect background" set of pixels, which as mentioned above may consume only 6 bits per block. Those blocks of pixels which do not satisfy these requirements, which are assumed to contain useful information such as portions of a pictorial image, will be compressed in normal JPEG fashion. The advantages of this method are: (i) full decompression of the image is not required to identify background areas, so that the background areas do not have to be decompressed; (ii) it uses a binary image as an input (i.e. a particular block either meets the background criteria or it does not), as opposed to a background-finding routine which used only a map of DC coefficients, which would require the input of a much larger gray-level image; and (iii) the processing for background suppression can be in its entirety performed in the compressed data stream, without the need to perform additional compression operations.

Figure 4:
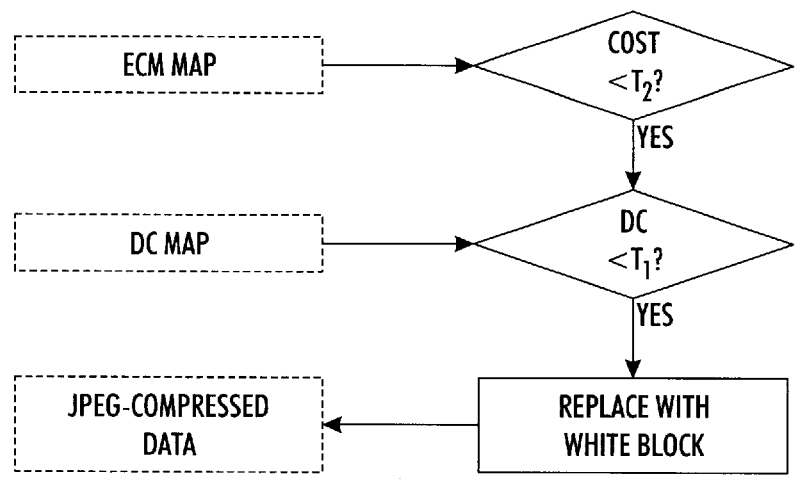
FIG. 4 is a simplified flow-chart illustrating a background suppression technique facilitated by an encoding cost map according to the present invention.

FIG. 4 is a flow chart illustrating the principle of replacing simple background areas with pure white areas which do not consume as much memory or decompression time. Image data compressed according to the JPEG standard can yield both the ECM and a map of DC coefficients for every 8×8 block of pixels therein, and both the ECM and DC coefficient can be obtained when the original image data is JPEG-compressed. As shown in the diagram, if the cost function for a block (or filtered cost function for set of blocks) is less than one threshold, and the DC component (or the filtered DC components of a set of blocks) is above another threshold, the system will recognize the block as a background-area block, which can be replaced with a pure white block in the compressed image. Therefore, while the compressed image data is examined, wherever a block of data satisfying the background-area requirements is identified, that block is replaced with the data of a simple white block, which consumes only 6 bits of data, when decompressing the compressed image data. Alternatively, it is possible to detect background areas and replace blocks of background-area pixels with pure white areas at transmitter 10 as the original image data is compressed. It should be understood that the use of pure white is an example illustrating the invention, but that other image values might be substituted.

While the invention has been described with reference to the structure disclosed, it is not confined to the details set forth, but is intended to cover such modifications or changes as may come within the scope of the following claims.

We claim:

1. A method of processing compressed digital data derived from an original image, the data being organized as a set of blocks, each block comprising a string of bits corresponding to an area of the original image, comprising the steps of:

counting a number of bits in each string of bits;

deriving a cost function for each string of bits, said cost function being a number related to the number of bits in each string of bits;

deriving an encoding cost map from the cost functions of the original image;

applying an image segmentation technique to the encoding cost map; and interpolating the encoding cost map to the original image, thereby identifying a first portion of the original image as being of a first type and identifying a second portion of the original image as being of a second type.

2. The method of claim 1, the applying step including the steps of thresholding each cost function derived from the compressed digital data, wherein each cost function not more than a predetermined first threshold is changed to zero, thereby yielding a thresholded encoding cost map.

3. The method of claim 1, the applying step including the step of applying an order-statistic screen to the encoding cost map.

4. The method of claim 1, the applying step including the step of applying a connected-components analysis to blocks to the encoding cost map.

5. A method of processing compressed digital data forming an original image, the data being organized as a set of blocks, each block comprising a string of bits corresponding to an area of the original image, each string of bits including data related to a DC component of the block, comprising the steps of:

obtaining a DC component for each block;

deriving a cost function for each string of bits, said cost function being a number related to the number of bits in each string of bits;

for each block, identifying the block as a background block if the DC component is not less than a first predetermined threshold and if the cost function is not more than a second predetermined threshold; and for each identified background block, replacing the string of bits for the background block with a predetermined fixed string of bits in the compressed image data.

6. The method of claim 5, wherein the predetermined fixed string of bits is consistent with a pure white image.

7. The method of claim 5, further comprising the step of transmitting strings of bits for each block, including transmitting fixed predetermined strings of bits corresponding to each identified background block.

\* \* \* \* \*